United States Patent
Kolekar et al.

(10) Patent No.: US 9,360,103 B2
(45) Date of Patent: Jun. 7, 2016

(54) LUBRICATION SYSTEM AND METHOD FOR REDUCING DIP LUBRICATION POWER LOSS

(71) Applicants: Ashland Licensing and Intellectual Property LLC, Dublin, OH (US); Imperial Innovations Limited, London (GB)

(72) Inventors: Anant S. Kolekar, Hounslow (GB); Andrew V. Olver, Reading (GB); Adam E. Sworski, Catlettsburg, KY (US); Frances E. Lockwood, Georgetown, KY (US)

(73) Assignee: Ashland Licensing and Intellectual Property, LLC, Lexington, KY (US)

( * ) Notice: Subject to any disclaimer, the term of this patent is extended or adjusted under 35 U.S.C. 154(b) by 323 days.

(21) Appl. No.: 13/965,557

(22) Filed: Aug. 13, 2013

(65) Prior Publication Data

US 2014/0048354 A1  Feb. 20, 2014

Related U.S. Application Data (60) Provisional application No. 61/683,261, filed on Aug. 15, 2012.

(51) Int. Cl.
*F16H 57/04* (2010.01)

(52) U.S. Cl.
CPC ........ *F16H 57/0409* (2013.01); *F16H 57/0447* (2013.01); *F16H 57/0457* (2013.01); *F16H 57/0483* (2013.01)

(58) Field of Classification Search
CPC ............ F16H 57/0409; F16H 57/0447; F16H 57/0457; F16H 57/0483
USPC ..................... 184/6.12, 11.1; 74/607; 475/160
See application file for complete search history.

(56) References Cited

U.S. PATENT DOCUMENTS

| | | | |
|---|---|---|---|
| 2012/0073403 A1* | 3/2012 | Perakes | F16H 57/0483 74/607 |
| 2012/0142476 A1* | 6/2012 | Gianone | F16H 57/0447 475/160 |
| 2014/0069230 A1* | 3/2014 | Trost | B60B 35/16 74/607 |

FOREIGN PATENT DOCUMENTS

| | | |
|---|---|---|
| DE | 4414000 C1 | 1/1996 |
| DE | 102009045426 A1 | 4/2011 |
| JP | 2008208884 A | 9/2008 |

OTHER PUBLICATIONS

Machine Translation of JP-2008-208884, Kobayashi.*
International Searching Authority, International Search Report and Written Opinion, International Application No. PCT/US2013/054870, mailed Oct. 16, 2013, pp. 12.

* cited by examiner

*Primary Examiner* — William E Dondero
*Assistant Examiner* — Robert T Reese
(74) *Attorney, Agent, or Firm* — Wood, Herron & Evans, LLP (57) ABSTRACT

Energy loss in a dip lubrication system is reduced by reducing the immersion depth of the gear within a pool of oil. This can be accomplished by increasing the pressure within the dip lubrication system which effectively reduces the flow rate of the oil so that the oil remains separated from the oil pool for a longer period of time thereby reducing the oil level and the immersion depth of the gear within the oil pool. Alternately, this can be accomplished by substituting a higher density gas for air which has the same effect. In a third embodiment the immersed gear includes wind vanes that direct air against the oil pool creating a trough which effectively reduces the immersion depth of the gear within the oil pool.

14 Claims, 8 Drawing Sheets

LUBRICATION SYSTEM AND METHOD FOR REDUCING DIP LUBRICATION POWER LOSS

CROSS-REFERENCE TO RELATED APPLICATION

This application claims the priority of application Ser. No. 61/683,261 filed Aug. 15, 2012, the disclosure of which is hereby incorporated by reference herein.

TECHNICAL FIELD

The present invention relates generally to a lubrication system and method for reducing power loss related to dip lubrication systems.

BACKGROUND

In dip lubrication systems, also referred to as splash lubrication systems, components such as gears are rotated through an oil sump. The rotating components then splash the lubricant on adjacent parts, thereby lubricating them. Drive axles and transmissions typically have several gear sets that are splash lubricated from an oil sump or reservoir. As the gears turn in the oil, the gears and bearings are coated with the circulating oil. At high speeds, the gears are essentially pumping the oil, creating a force corresponding to energy or shear losses in the fluid. Although one does not want to unduly reduce the amount of lubricant in the system, the immersion depth of the component into the oil relates to power loss. The deeper the component is immersed in the oil, the greater the power loss. Accordingly, it is desirable to reduce power loss without decreasing the overall volume of the lubricant within the system.

There is a need for a lubrication system and method for reducing power loss, such as in dip lubrication systems, that addresses present challenges and characteristics such as those discussed above.

SUMMARY

The present invention is based on the discovery that power loss in a dip lubrication system can be reduced using the gas in the system. The present invention is further premised on the realization that the immersion depth of a component, such as a gear, into an oil sump in a splash lubrication system can be reduced by either reducing the rate at which the oil returns to the sump or by pushing the oil away from the gears in the sump. More particularly, by adjusting the internal pressure of the dip lubrication system to increase the density of the gas within the system, effectively reduces the return flow rate of the oil to the sump thereby reducing the immersion depth and energy loss. Alternately, the dip lubrication system can be filled with a gas denser than air which will have the same effect. In an alternate embodiment, air or other gas can be directed at the location of the sump where the gear is immersed, pushing some of the oil to either side to create a trough effect and thereby reduce immersion depths and thereby power loss.

According to an exemplary embodiment, a lubrication system for reducing dip lubrication power loss comprises a housing defining an internal volume and a component rotatably mounted within the housing. The housing is fluidly sealed for containing a gas of greater density than air at atmospheric pressure. The housing is also configured to hold a pool of a lubricant. The component is mounted within the housing such that a portion of the component is immersed into the pool of the lubricant. Furthermore, the component is configured to rotate through the pool for splashing the lubricant within the housing.

In one aspect, the housing contains the gas. The gas is compressed in order to have a pressure greater than atmospheric pressure. In another aspect, the gas has a specific gravity greater than air.

According to another exemplary embodiment, a method for reducing power loss for a dip lubrication system includes fluidly sealing a housing defining an internal volume with a rotatable component therein. The method includes pumping a gas into the internal volume such that the gas has a greater density than air at atmospheric pressure. In addition, the method includes containing the gas with greater density than air at atmospheric pressure within the internal volume.

In one aspect, the method further includes collecting a pool of a lubricant within the internal volume of the housing and immersing a portion of the component within a pool of the lubricant to an immersion depth. The method also includes rotating the component through the pool of the lubricant to splash a portion of the lubricant within the housing. In addition, the method includes reducing the immersion depth of the component while maintaining a generally fixed volume of lubricant within the internal volume and returning the portion of splashed lubricant back to the pool of the lubricant.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below serve to explain the invention.

DETAILED DESCRIPTION

The present invention is an improvement to a splash lubrication system which can be used with virtually any splash lubrication or dip lubrication system. These can be, for example, the drive axle for a motor vehicle, a transmission, gear boxes for various applications such as helicopters, wind turbines, and the like. These splash lubrication systems have a component such as a gear that is immersed in a pool or sump of oil and rotates to splash the oil about the system to thereby lubricate other gears or moving parts.

Figure 1:
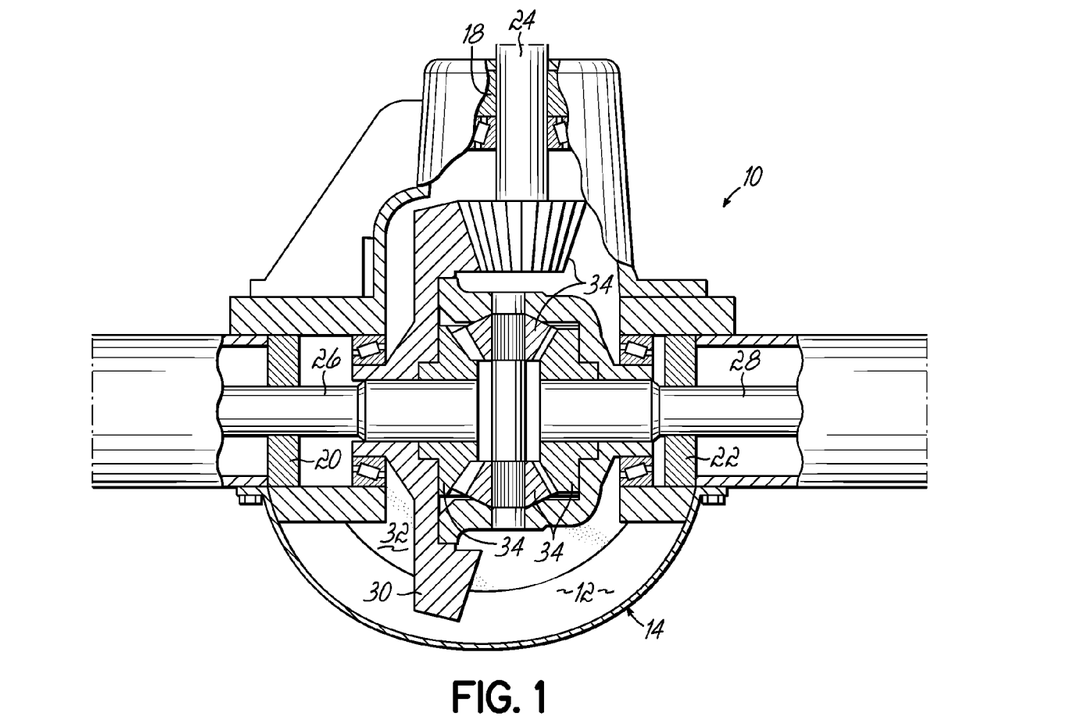
FIG. 1 is an overhead cross sectional view partially broken away of an exemplary axle according to the present invention.

One exemplary system is shown in FIG. 1 which is the drive axle 10 for a motorized vehicle. This representation is diagrammatic and for illustration purposes only. Normally, such systems operate at ambient pressure filled with oil and air. But, according to the present invention, an internal volume 12 of an axle 10 is maintained at super-atmospheric pressures. As shown, the system has a sealed housing 14 with a gas inlet valve 16 that allows air or other gas to be pumped into the housing 14 to increase the internal pressure within the housing 14. The housing 14 provides a gas tight containment system, also referred to herein as fluidly sealed.

The system further includes rotary seals 18, 20 and 22 at each axle 24, 26 and 28 permitting the axles 24, 26, 28 to rotate without allowing the gas to escape the housing 14 maintaining the internal pressure.

The internal pressure will be above atmospheric. Generally, it can be, for example, two bars, three bars or four bars, or higher. As long as the pressure of the gas does not cause a negative interaction of the gas with the lubricant, the pressure can be increased. Likewise, the internal pressure cannot exceed the effective sealing capacity of the respective seals 18-22.

With reference to FIG. 1, the axle includes various gears with a planetary gear 30 which rotates into the pool 32 of oil. This splashes the oil around the interior housing 14 causing oil to contact the remaining gears 34. As the planetary gear 30 rotates, only a certain portion 31 of the gear 30 is actually immersed in the pool 32 of oil, although with the axle the component that rotates in the oil is a gear, it can be virtually any rotating structure in place of the gear.

Figure 2:
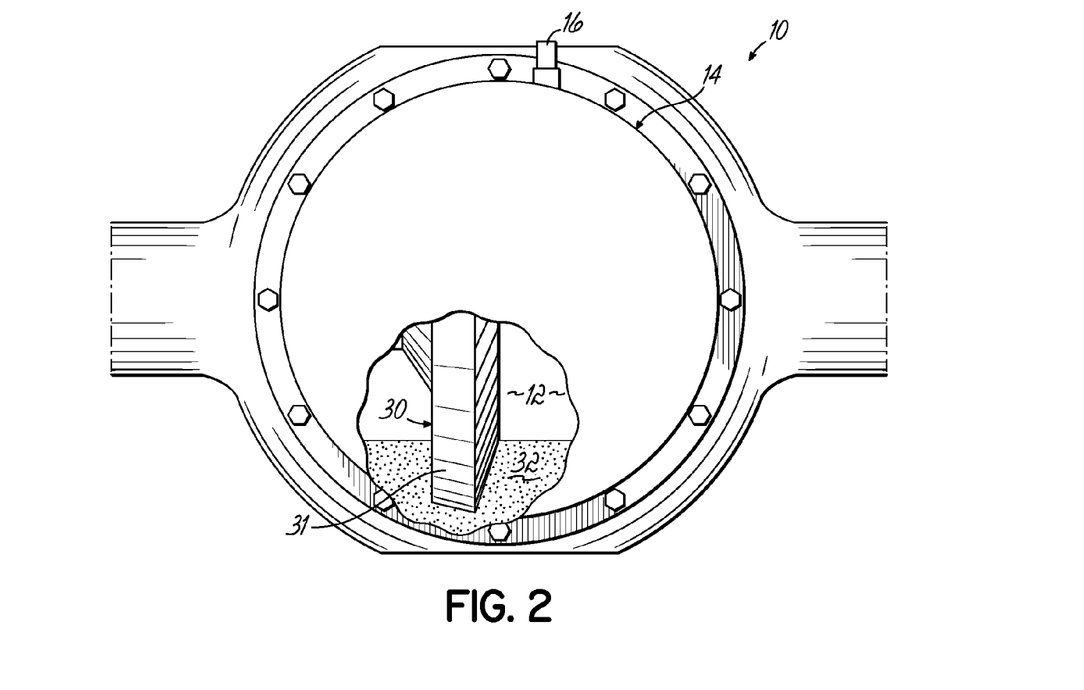
FIG. 2 is a rear view partially in cross section of the axle shown in FIG. 1.
Figure 3:
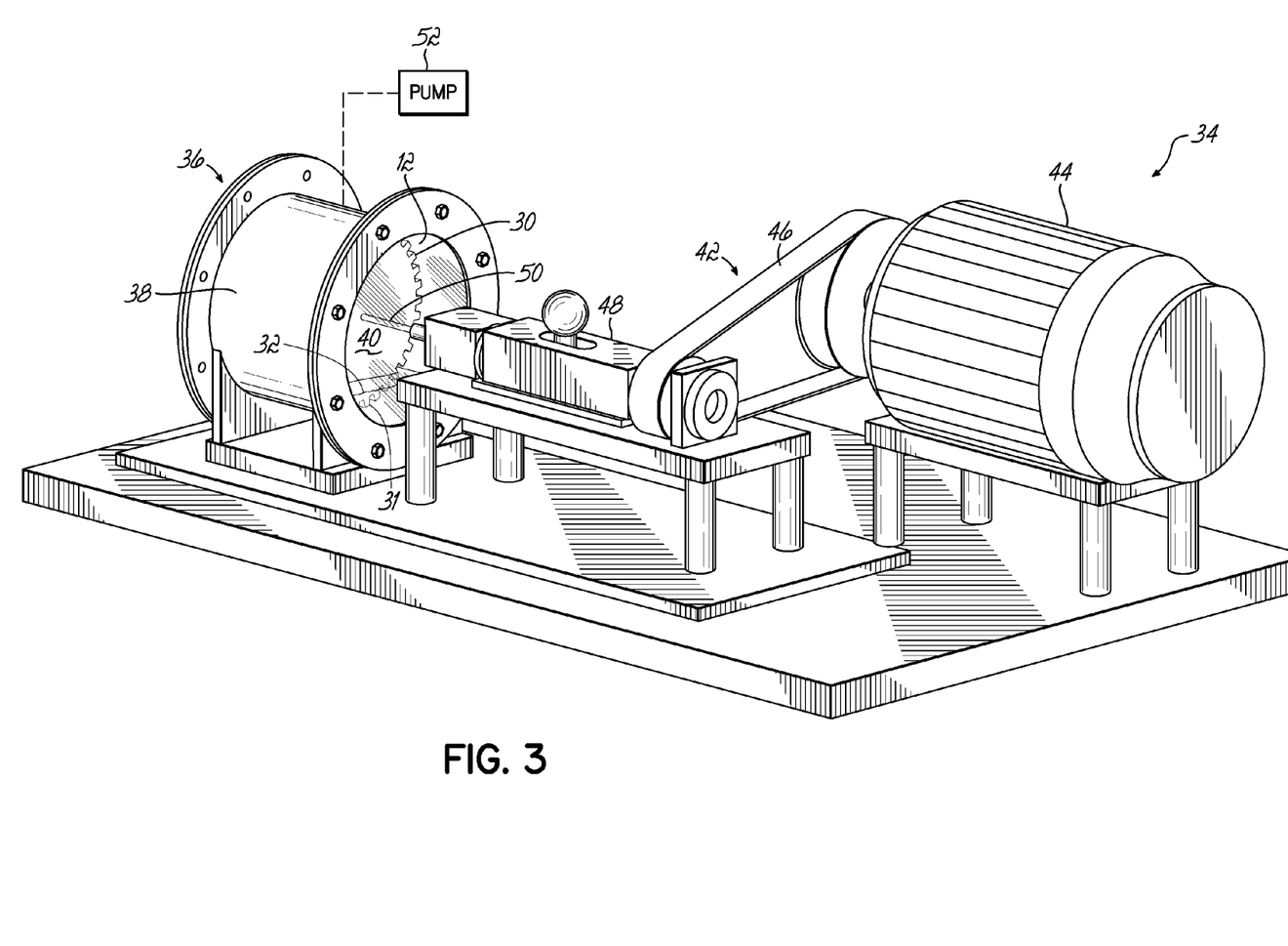
FIG. 3 is a perspective view of a dip lubrication test system.

By way of example and observation, FIG. 3 shows an embodiment of a lubrication system in the form of a dip lubrication test system 34. The dip lubrication test system 34 is generally a simplified representation of the drive axle 10 for a motorized vehicle shown in FIG. 1 and includes the gear 30 having the portion 31 immersed within the pool 32 of lubricant within an enclosure 36. The enclosure 36 includes a cylindrical housing 38 having a pair of polycarbonate endplates 40 sealing the internal volume 12 therein with o-rings (not shown). The gear 30 is rotatably driven within the enclosure 36 by a drive mechanism 42 having an electric motor 44, a drive belt 46, a clutch 48, and a spindle 50. The electric motor 44 has selective, variable speed settings and is operatively coupled to the drive belt 46 for rotating the clutch 48. The clutch 48 is removably connected to the spindle 50 so that the spindle 50 may be either rotatably driven by the electric motor 44 or freewheel in position. The spindle 50 extends through at least one of the endplates 40 and into the internal volume 12. In this respect, the gear 30 is fixed to the spindle 50 such that the gear 30 may be rotatably driven or freewheel within the enclosure 36 for measuring the effects of power loss due to dip lubrication as the portion 31 of the gear 30 moves through the pool 32 of lubricant. According to an exemplary embodiment, the electric motor 44 is a 1 horsepower AC motor for rotatably driving the gear 30 to a maximum speed of 335 rad/s. Also, internal volume 12 of the enclosure 36 without the gear 30 is 1.77 dm$^3$ and the lubricant volume is 0.128 dm$^3$. The dip lubrication test system 34 also includes thermocouples (not shown) for measuring initial lubricant temperature and the lubricant temperature between tests. FIGS. 1-3 show a lubricant fill level along the gear 30 of approximately 25% of a radius of the gear 30. Please note that use of a proper quantity of the lubricant, such as oil or water, is important in any dipped lubrication system. Improper quantity of lubricant may be detrimental to the system and may include such effects as increased gear bulk temperatures and increased gear failure risks. In these cases, the oil amount required for the lubrication may still be sufficient but the oil circulation and cooling is controlled by the lubricant properties.

According to an exemplary embodiment, the gear 30 and the oil within the dip lubrication test system 34 has the following respective qualities:

TABLE 1

| Gear Dimensions | |
|---|---|
| m (module) | 4 mm |
| α (pressure angle) | 20° |
| z (number of teeth) | 38 mm |
| b (tooth face width) | 40 mm |
| R$_o$ (gear outer radius) | 80 mm |

TABLE 2

| Lubricant Material Properties | | | | |
|---|---|---|---|---|
| | Kinematic viscosity, cSt | | Density, g/cm$^3$ | Surface tension, mN/m |
| | 40° C. | 100° C. | 15° C. | 20° C. |
| Oil #1 | 14.8 | 3.3 | 0.855 | 21.21 [8] |
| Oil #2 | 30.4 | 4.6 | 1.011 | 27.75 [8] |
| Oil #3 | 196.4 | 23.6 | 0.842 | 30 [8] |
| Oil #4 | 157 | 15.1 | 0.884 | 30.81 [8] |
| Dist. Water | 0.65 | 0.29 | 1.000 | 72.8 [8] |

The testing methodology of the dip lubrication system 34 is based on the inertia rundown technique. This method relies on the determination of the churning torque and power due to drag acting on the gear 30 by churning of the oil. After the gear 30 reaches a constant, desired speed, the clutch 48 disengages from the gear 30, which, in turn, decelerates while rotating on the spindle 50 within the surrounding oil. The dip lubrication test system 34 also includes a data acquisition system (not shown) operatively connected to a speed sensor (not shown) for collecting speed data related to the gear 30 during use.

Figure 4A:
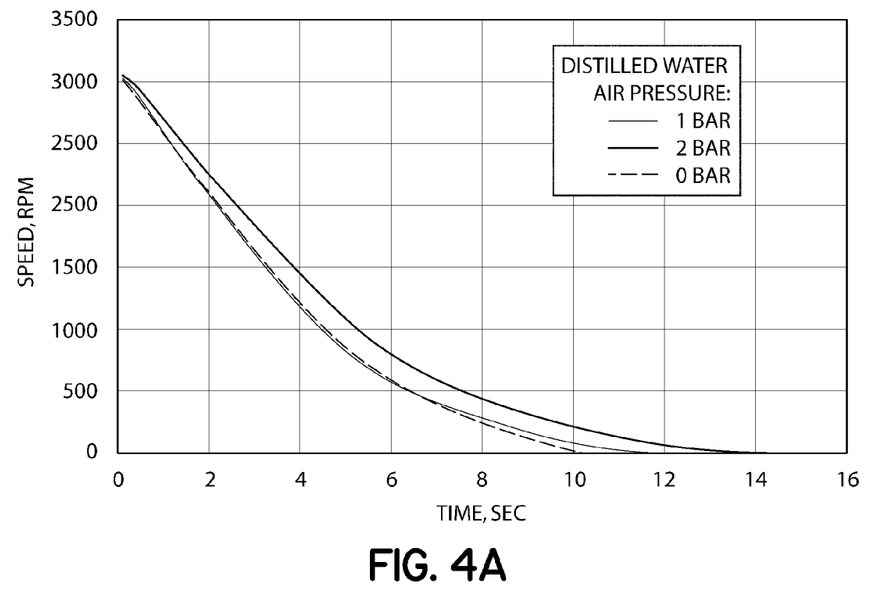
FIG. 4A is a chart of rundown results for distilled water.
Figure 4B:
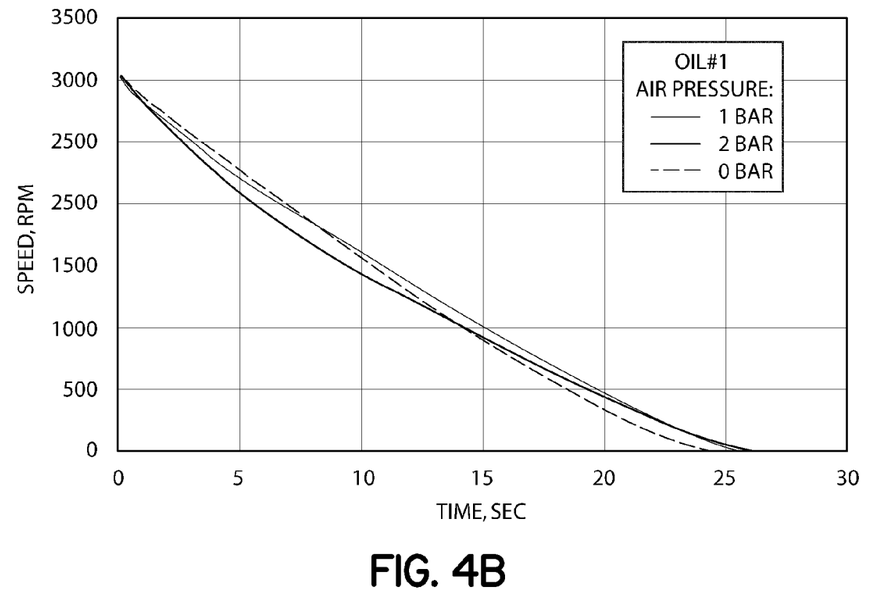
FIG. 4B is a chart of rundown results for oil #1.
Figure 4C:
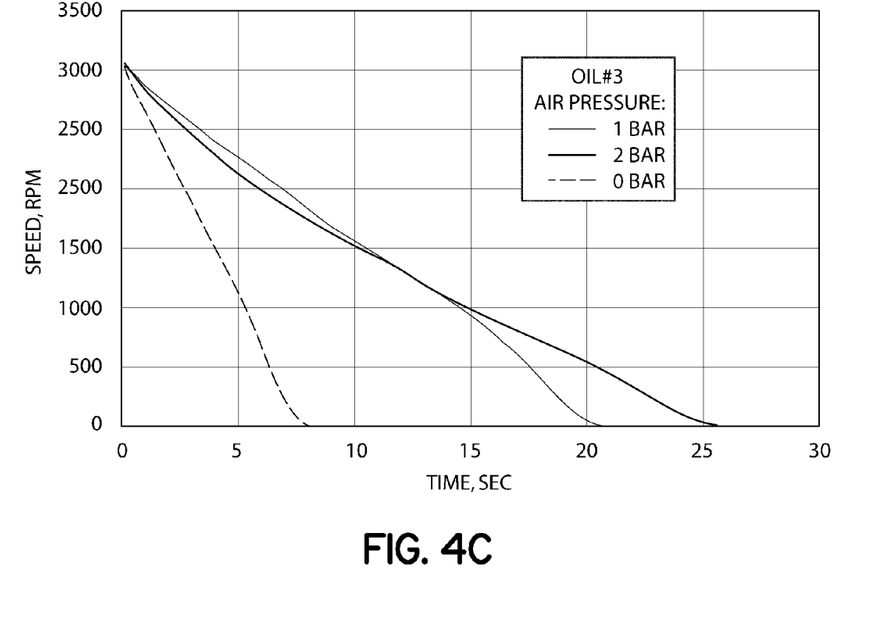
FIG. 4C is a chart of rundown results for oil #3.

In order to rotate the gear 30 within the enclosure at various pressures, a pump 52 connects to the internal volume 12 within the enclosure 36 via the inlet valve 16. With the aid of the pump 52, the pressure within the enclosure 36 may be selectively varied to atmospheric pressure, negative pressure, or positive pressure. As described herein, negative pressure may also be referred to as a vacuum and positive pressure may be referred to as compressed gas. According to exemplary embodiments, the dip lubrication test system 34 was operated through inertia rundown at 0 bar, 1 bar, and 2 bar. Generally, the term "1 bar" may be used interchangeably with "atmospheric pressure." FIGS. 4A-4C show the inertia rundown for various lubricants, such as distilled water, relatively low viscosity oil #1, and relatively high viscosity oil #3.

During operation of the dip lubrication test system 34, the total torque acting on the gear 30 is a product of the moment of inertia of the gear ($I_g$=0.00282 kg·m$^2$) and the angular deceleration. Therefore, by capturing the gear 30 deceleration after the declutching from the electric motor 44, the torque exerted by test oil is evaluated using Newton's second law of motion represented for rotation as:

$$T = I_g a = I_g \frac{dw}{dt}$$

With negative pressure within the enclosure 36, the only restraining torque during rundown is churning loss on the gear 30 and relatively small contribution of mechanical loss from the bearing housing (not shown) and oil seal related to the gear 30 rotatably mounted on the spindle 50. With compressed gas, such as air within the enclosure 36, both churning of liquid and air windage contribute to overall losses. To remove the effect of these losses from data collected by the data acquisition system, liquid churning power losses were computed by subtracting the power loss measured when the housing was filled to the prescribed level with liquid, from that obtained when the housing was empty of liquid. According to an exemplary embodiment of the dip lubrication testing system 34, these losses were approximately 7.5 W at 310 rad/s and calculated based on the following equations for churning torque and churning power loss, respectively:

$$T_{ch} = T - (T_b + T_z)$$

$$P_{ch} = w T_{ch}$$

Figure 5A:
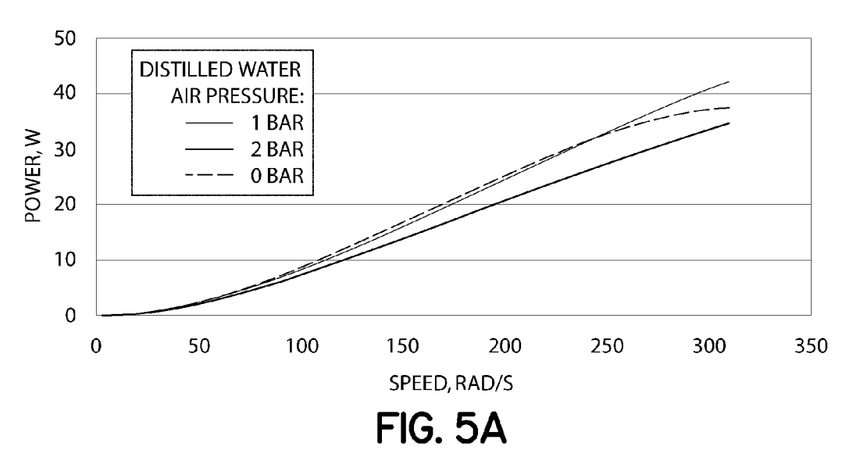
FIG. 5A is a chart of churning power loss consumption for distilled water.
Figure 5B:
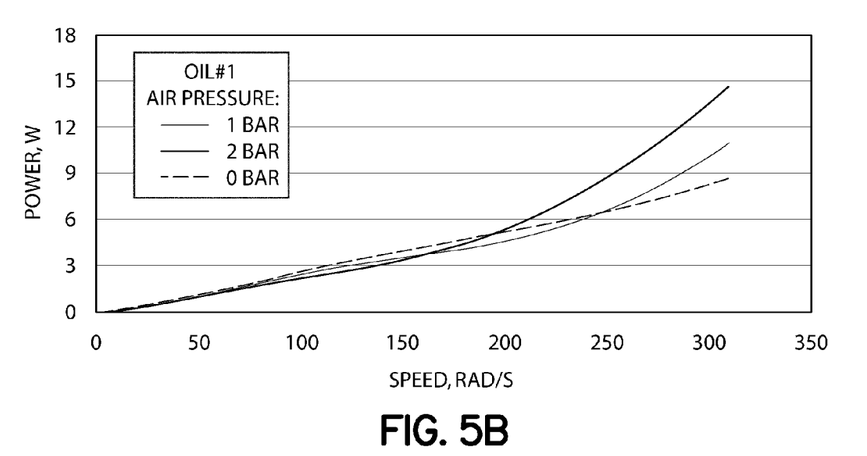
FIG. 5B is a chart of churning power loss consumption for oil #1
Figure 5C:
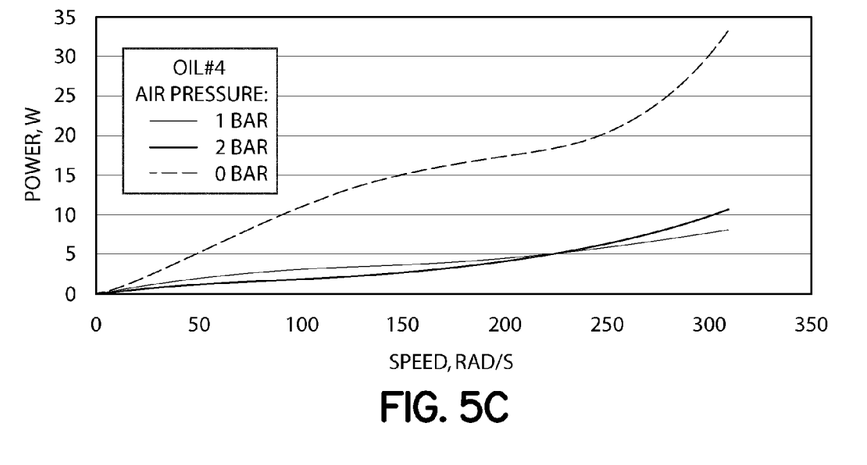
FIG. 5C is a chart of churning power loss consumption for oil #4.

FIGS. 5A-5C show the power loss comparison for distilled water, oil #1, and oil #4, respectively. As described above, oil #4 is considerably more viscous than oil #1. As such, the losses for oil #4 were greater within the vacuum than when gas was present. However, there was little effect of air pressure for the less viscous fluids (Oil #1, water).

Figure 6A:
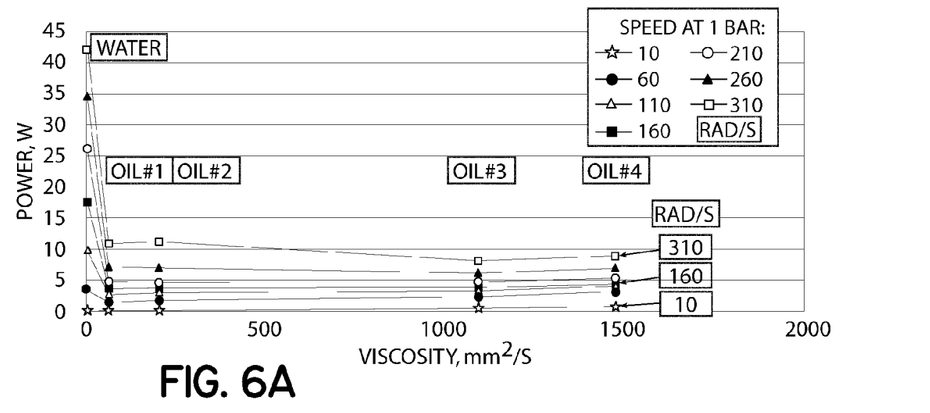
FIG. 6A is a chart of churning power loss consumption at a constant speed interval at 1 bar.
Figure 6B:
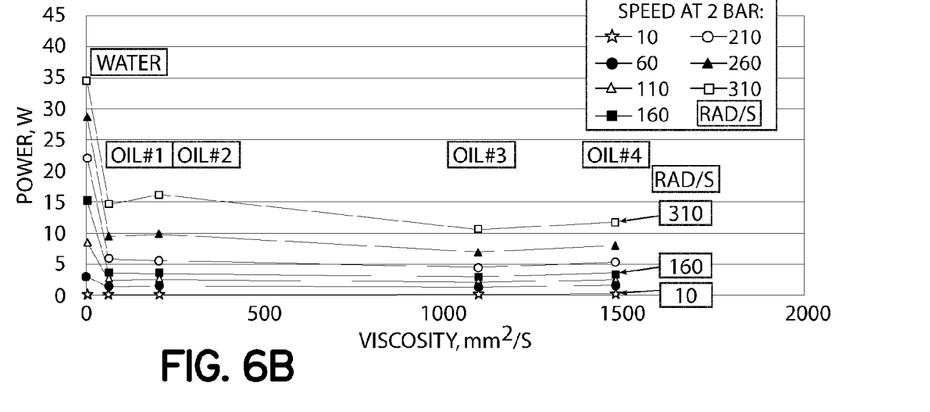
FIG. 6B is a chart of churning power loss consumption at a constant speed interval at 2 bar.
Figure 6C:
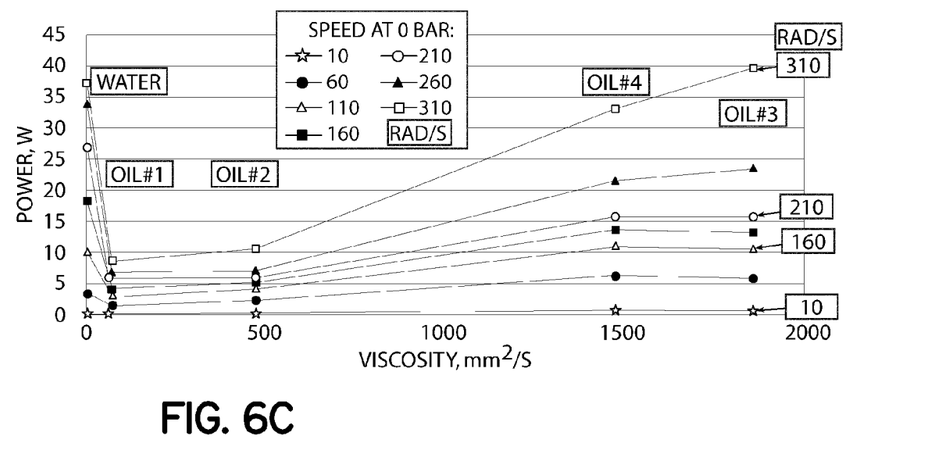
FIG. 6C is a chart of churning power loss consumption at a constant speed interval at 0 bar.

FIGS. 6A-6C show variation of the churning power loss with the viscosity at constant speed intervals for the atmospheric pressure, compressed gas, and vacuum, respectively. For atmospheric pressure and compressed gas, there are approximately constant power losses with viscosity increase for oils. At higher speeds, power loss initially increases and then decreases before increasing again with the viscosity. It is believed that the effect of gravity causes the oil to stick on the surface of the enclosure 36 and gear 30 for a longer time before draining back to the sump as viscosity of the oil increases. For the vacuum, there is a rapid increase in the power loss as oil viscosity increases. For comparison, vacuum churning loss increases up to 4 times relative to atmospheric pressure for high speed. However, the power loss related to water tends to not be as affected by the air pressure variation given that compressed gas gives lower losses compared to the other two conditions.

Figure 7:
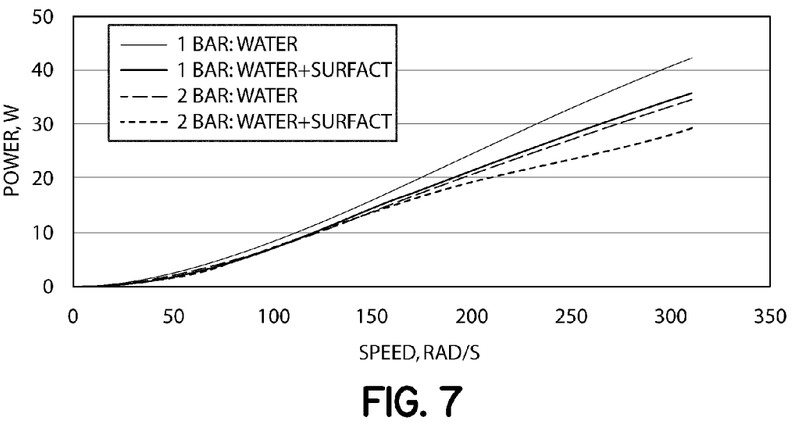
FIG. 7 is a chart of churning power loss consumption for distilled water with an added surfactant.

The results for water show relatively higher power losses than might be expected from extrapolating the results for the oils in FIGS. 6A-6C. However, water has a somewhat higher density (1 g/cm3) and a much higher surface tension than any of the oils. For this reason, surfactants may be used with water to reduce the surface tension and increase the contact of two materials. Detergent, such as dishwashing detergent, may be used to lessen the surface tension of water. The addition of surfactants has a stabilizing effect on the water bubbles. Water with surfactant shows reduction in the losses proving effect of surface tension as shown in FIG. 7 for both atmospheric pressure and compressed gas. In this respect, atmospheric pressure power loss is higher than compressed gas, whereas churning power loss for compressed gas with surfactant is less than 1.4 times compared to atmospheric pressure with no surfactant.

Still greater insights into the effect of pressure within the enclosure 36 on power loss may be appreciated by performing a dimensional analysis on the above findings as related to the Reynolds number, Froude number, and Bond number.

The Reynolds number is defined from momentum as:

$$Re = \frac{wR_p^2}{v_0}$$

The Froude number relates to the dominant effect for free-surface flows and is represented as:

$$Fr = \frac{w^2 R_p}{g}$$

The Bond number is a ratio of body forces to surface tension forces and is represented as:

$$Bo = \frac{\rho g R_p^2}{\tau}$$

Finally, a power parameter is calculated as pressure multiplied by immersed gear surface area and pitch velocity. The power parameter is calculated at each pressure within the enclosure 36 and compared over the Froude number and the Reynolds number.

By way of comparison, it becomes clear that at higher speeds and atmospheric pressures, the power loss is lower relative to vacuum and compressed air. However, as speed decreases, compressed air results in lower losses while vacuum is detrimental. With decreasing Reynolds number, the power loss remains somewhat constant. There is also a considerable reduction in the power loss for the compressed air.

Figure 8:
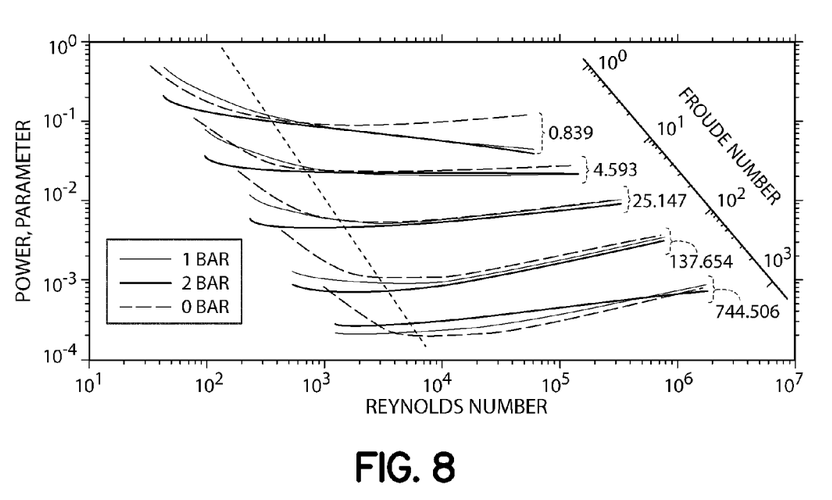
FIG. 8 is a non-dimensional chart relating a power parameter to Reynolds number for various pressures.

FIG. 8 shows a 3D plot of the Reynolds number, Froude number and Power parameter for pressure within the enclosure 36 at 0 bar, 1 bar, and 2 bar. The variation of power loss with the Reynolds number is distinctly different for high and low Froude numbers. For low viscosity, air density variations do not affect the power parameter greatly, except for initial speeds where the vacuum causes higher power loss. As speed and viscosity increase, the power loss remains constant to a certain point and then varies significantly with the air pressure. Relative to atmospheric pressure, the power loss for the vacuum increases rapidly with speed, whereas the power loss for compressed air decreases for low to medium speeds. Specifically, the maximum churning power loss variation for the gear 30 within the vacuum is approximately 3.74 times higher than at atmospheric pressure. However, the maximum churning power loss variation for the gear 30 within compressed air is approximately 2.24 times lower than at atmospheric pressure. FIG. 8 also includes a dividing line to indicate at which Froude number and Reynolds number pressure within the enclosure 36 does not significantly affect the power parameter.

The dominant feature is the large change in the power loss parameter with Froude number (ratio of inertial to gravitational force). This is consistent with an observation that the return of the fluid to the sump and the immersion of the gear 30 are entirely dependent upon gravity. For this reason, it is believed that the losses in dipped lubrication are, in large part, due to acceleration of the fluid, limited by gravitational replenishment of the oil into the pool within the enclosure 36.

The variation of the power parameter with Reynolds number, as shown in FIG. 8, is an indication of the effect of viscous forces. However, the results showing that higher viscosity lubricants do not always give a higher power parameter at a particular Froude number suggest that viscous forces do not control the net behavior of the system. Accordingly, it is believed that viscosity lubricants are slower to return to the pool under the influence of gravity and, in turn, yield a lower immersion depth with reduced inertial losses.

Furthermore, introducing the surfactant into the water, as indicated in FIG. 7, tends to reduce the surface tension by about 25% and resulted in a reduction in the power loss of up to approximately 20%. Most of the oils had similar Bond numbers, but more aqueous fluids may have lower values due to higher surface tensions. For this reason, lower power losses are obtained with an intermediate viscosity lubricant and the lowest available surface tension.

In general, the pressure within the enclosure 36 affects the density of the gas therein and reduces power loss. It is believed that the denser air flowing radially from the rotating gear 30 disturbs the free surface of the lubricant. In turn, the gear 30 becomes more shallowly immersed and the flow rate of the accelerated lubricant is reduced, leading to lower power losses. The effect is evidently increased if the fluid is more viscous since the return flow of the more viscous fluid is already diminished.

In an embodiment of the present invention, the same effect can be achieved by altering the gas within the axle 10. For example, normally the interior of an axle will include air and will be vented. The present invention provides the sealed housing 14 for the axle, utilizing seals 18, 20 and 22. In this second embodiment, the air is replaced with a gas which is denser than air. The gas can be any dense gas which is inert with respect to the oil. Preferably, it should be a gas which is not flammable or combustible. An exemplary gas could be, for example, argon, as well as other gaseous compositions such as halogenated hydrocarbons.

Of course, a higher density gas can be incorporated within the present system and at super-atmospheric pressure to further increase the density of the gas thereby reducing the flow rate of the lubricant and in turn reducing the immersion depth. This operates in the same manner as discussed above.

Figure 9:
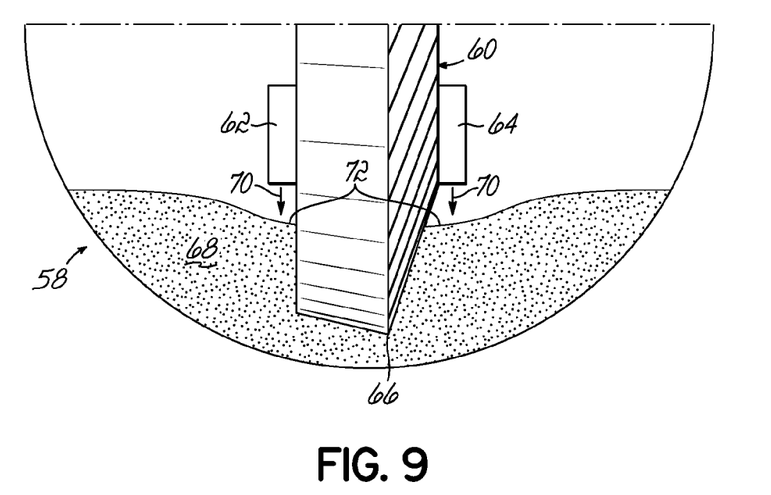
FIG. 9 is a diagrammatic rear view depiction of a splash lubrication system according to the present invention.
Figure 10:
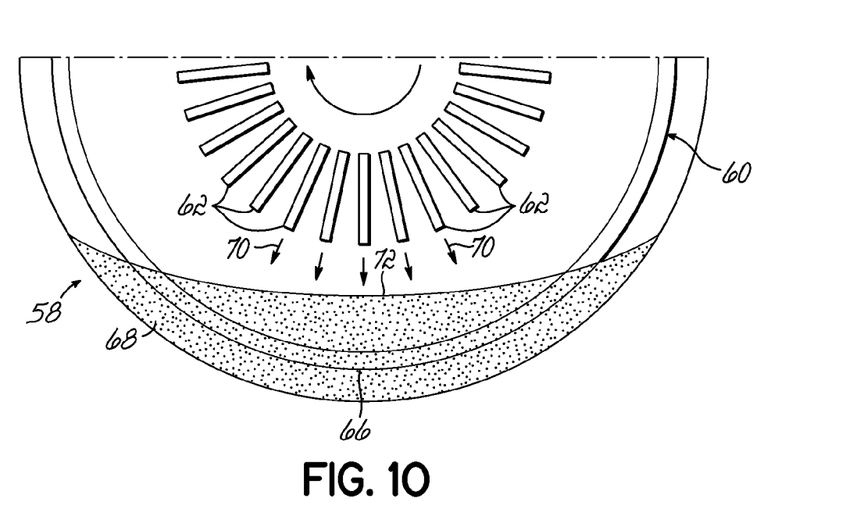
FIG. 10 is a diagrammatic side cross sectional view of the splash lubrication system of FIG. 9.

FIGS. 9 and 10 show another embodiment of the present invention. As shown in FIGS. 9 and 10, the rotating component such as a gear 60 in a dip lubrication system 58, has a plurality of wind vanes 62 and 64 on the sides of the gear 60. The vanes 62, 64 extend only part of the way to the peripheral edge 66 of the gear 60 so that they do not extend into the pool of oil 68, which would increase power loss. Rotation of the gear 60 causes a downward flow of air as indicated by arrows 70, which cause a trough or depression 72 to form in the oil at the point of immersion thereby reducing immersion depth.

As shown, the vanes 62, 64 are on both sides of the gear 60. However, the vanes 62, 64 can be on only one side of the gear 60 or can be positioned on the shaft (not shown) attached to the gear 60 or any location whereby rotation of the gear 60 will cause rotation of the vanes 62, 64. But, preferably the vanes 62, 64 are attached to at least one side of the gear to thereby cause the trough to form in the oil immediately alongside the gear.

The plurality of radially extended vanes, 62, 64 is positioned around the gear 60 so that a downward air flow is maintained. This will also create an upward airflow, which in turn will maintain oil suspended above the gear, also reducing the oil level and the immersion depth. This embodiment is also more efficient if the gas within the system is either denser than air or the pressure is super-atmospheric. This permits all the embodiments of the present invention to be utilized at the same time.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative dispensing assembly and method and illustrative examples shown and described. Accordingly, departures may be from such details without departing from the scope or spirit of the general inventive concept.

What is claimed is:

1. A lubrication system for reducing dip lubrication power loss, comprising;
   a housing defining an internal volume, said housing fluidly sealed and containing a gas at a pressure of at least two bars and a pool of a lubricant therein; and
   a component rotatably mounted within said housing such that a portion of said component immerses into the pool of the lubricant, said component configured to rotate through the pool for splashing the lubricant within said housing.

2. The lubrication system of claim 1 wherein said gas is air.

3. The lubrication system of claim 1 wherein said gas has a specific gravity greater than air.

4. The lubrication system of claim 3 wherein said gas is argon.

5. The lubrication system of claim 1 further comprising:
   an inlet valve fluidly connected to said internal volume for introducing the gas into said housing.

6. The lubrication system of claim 1 wherein said component has at least one vane configured to direct the gas windage toward the pool of the lubricant for reducing immersion of said component within the pool of the lubricant.

7. The lubrication system of claim 1 wherein said component is a gear.

8. A dip lubrication system for reducing dip lubrication power loss comprising:
   a housing defining an internal volume, said housing fluidly sealed and containing air at a pressure of at least two bars and a pool of lubricant therein; and
   a component rotatably mounted within said housing, such that a portion of said component immerses into the pool of lubricant, said component configured to rotate through the pool of lubricant for splashing the lubricant within said housing.

9. A method of reducing power loss for a dip lubrication system,
   said system having a fluidly-sealed housing defining an internal volume, said internal volume including a lubricant and rotatable component which is partially immersed in said lubricant, said method comprising;

introducing a gas into the internal volume and establishing a pressure in said internal volume of at least two bars; and containing the gas within the internal volume as said rotatable component rotates in said lubricant.

10. The method of claim 9 further comprising:
collecting a pool of a lubricant within the internal volume of the housing;
immersing a portion of the component within a pool of lubricant to an immersion depth;
rotating the component through the pool of the lubricant to splash a portion of the lubricant within the housing;
reducing an immersion depth of the component while maintaining a generally fixed volume of lubricant within the internal volume; and
returning the portion of splashed lubricant back to the pool of the lubricant.

11. The method of claim 10 wherein reducing the immersion depth further comprises:
directing a portion of the gas toward the pool of the lubricant with the rotating component to create a trough effect in the pool that reduces the immersion depth of the component.

12. The method of claim 11 wherein the component has at least one vane and directing the portion of the gas further comprises:
rotating the at least one vane whereby the vane directs the portion of the gas to create the trough effect in the pool.

13. The method of claim 9 wherein said gas has a specific gravity greater than air.

14. The method of claim 9 further comprising:
introducing the gas into the internal volume of the housing via an inlet valve.

\* \* \* \* \*